United States Patent
Schiliro et al.

(10) Patent No.: US 10,316,971 B2
(45) Date of Patent: Jun. 11, 2019

(54) INSERT AND INTERNAL COMBUSTION ENGINE COMPRISING INSERT

(71) Applicant: MTU FRIEDRICHSHAFEN GMBH, Friedrichshafen (DE)

(72) Inventors: Michele Schiliro, Gomadingen (DE); Anko Ernst, Salem (DE); Ludwig Kläser-Jenewein, Frickingen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 14/412,151

(22) PCT Filed: Jun. 28, 2013

(86) PCT No.: PCT/EP2013/001910
§ 371 (c)(1),
(2) Date: Dec. 30, 2014

(87) PCT Pub. No.: WO2014/005687
PCT Pub. Date: Jan. 9, 2014

(65) Prior Publication Data
US 2015/0144089 A1    May 28, 2015

(30) Foreign Application Priority Data

Jul. 4, 2012 (DE) .................. 10 2012 013 379

(51) Int. Cl.
| | |
|---|---|
| *F02F 1/00* | (2006.01) |
| *F02F 1/16* | (2006.01) |
| *F02F 1/20* | (2006.01) |
| *B22D 19/00* | (2006.01) |
| *F02F 11/00* | (2006.01) |
| *F16J 15/08* | (2006.01) |

(52) U.S. Cl.
CPC ........... *F16J 15/0887* (2013.01); *F02F 1/166* (2013.01); *F02F 11/002* (2013.01); *F02F 11/005* (2013.01); *B22D 19/0009* (2013.01); *F02F 1/004* (2013.01); *F02F 1/16* (2013.01); *F02F 1/20* (2013.01); *F05C 2201/021* (2013.01)

(58) Field of Classification Search
CPC ..... F02F 1/004; F02F 1/20; F02F 1/16; B22D 19/0009; F05C 2201/021
USPC ....................................... 123/193.2
See application file for complete search history.

(56) References Cited

U.S. PATENT DOCUMENTS 2,939,753 A * 6/1960 Otto Schilling ....... F02F 11/002
  123/193.3
3,661,135 A   5/1972 Weiss
(Continued)

FOREIGN PATENT DOCUMENTS

CH    475474 A    7/1969
DE    1783011 U    2/1959
(Continued)

*Primary Examiner* — Jacob M Amick
*Assistant Examiner* — Charles Brauch
(74) *Attorney, Agent, or Firm* — Lucas & Mercanti, LLP; Klaus P. Stoffel

(57) ABSTRACT

An insert that can be positioned in a gap between a first front face of a cylinder liner, the first front face facing a cylinder head, and a second front face of the cylinder head, the second front face facing the cylinder liner. The insert includes at least one compressible material.

20 Claims, 2 Drawing Sheets

(56) References Cited

U.S. PATENT DOCUMENTS

| | | | |
|---|---|---|---|
| 3,754,766 A * | 8/1973 | Asplund | F01D 11/005 |
| | | | 277/644 |
| 4,742,759 A * | 5/1988 | Hayakawa | F02B 23/0603 |
| | | | 92/176 |
| 5,377,643 A * | 1/1995 | Schibalsky | F16J 15/0887 |
| | | | 123/193.3 |
| 5,876,038 A | 3/1999 | Bohm et al. | |
| 2003/0080517 A1 | 5/2003 | Reisel | |
| 2006/0105167 A1* | 5/2006 | Ogawa | B32B 5/00 |
| | | | 428/355 AK |
| 2007/0107689 A1* | 5/2007 | Oogake | F02F 1/004 |
| | | | 123/193.2 |
| 2009/0041635 A1* | 2/2009 | Berkey | F01N 13/0093 |
| | | | 422/177 |

FOREIGN PATENT DOCUMENTS

| | | | | |
|---|---|---|---|---|
| DE | 1122766 B | 1/1962 | | |
| DE | 19839712 A1 * | 3/2000 | | F02F 1/004 |
| DE | 102005003931 A1 | 8/2006 | | |
| EP | 1918559 A1 | 5/2008 | | |
| GB | 1261137 A | 1/1972 | | |

* cited by examiner

INSERT AND INTERNAL COMBUSTION ENGINE COMPRISING INSERT

The present application is a 371 of International application PCT/EP2013/001910, filed Jun. 28, 2013, which claims priority of DE 10 2012 013 379.0, filed Jul. 4, 2012, the priority of these applications is hereby claimed and these applications are incorporated herein by reference.

BACKGROUND OF THE INVENTION

The invention relates to an insert for a clearance volume between a cylinder liner and a cylinder head, and to an internal combustion engine containing the insert.

Inserts and internal combustion engines of the type discussed here are known. An internal combustion engine of this kind comprises at least one cylinder, which comprises a cylinder liner, and furthermore comprises a cylinder head, which closes off the cylinder on a side situated opposite a piston arranged movably in the cylinder liner—as seen in the axial direction of the cylinder liner—and has a second end face facing first end face of the cylinder liner. The cylinder liner is held in the internal combustion engine by being pressed against a "balcony seat" of a crankcase by the cylinder head in the region of a liner collar. Here, the contact forces are transmitted via a liner collar region arranged radially on the outside in order to avoid shearing off a radially inner region of the cylinder liner. In order to absorb the contact forces, a force introduction element is provided in the radially outer region of the cylinder liner, said element typically being designed as a copper-plated iron ring. It is preferably via this element that all the force flows from the cylinder head to the liner collar of the cylinder liner. To avoid contact forces also acting in the radially inner region of the liner collar, a clearance is preferably provided between the first end face and the second end face, thus overall producing an annular gap which—as seen in the radial direction—is open toward an interior of the cylinder liner. This gap, which is also referred to as a clearance volume, has a negative effect on combustion in a combustion chamber of the cylinder because unburnt residual gas collects or an undefined mixture consisting of air, combustion gas and products of incomplete combustion can form in the clearance volume. In particular, it is possible that a pressure wave caused by combustion in the combustion chamber will ignite residual gas in the clearance volume, leading to combustion knock. Moreover, it is possible for lubricant, especially oil, to collect in the clearance volume, leading to soot formation and the accumulation of glow points, which, in turn, enter the combustion chamber in an undefined way and can lead there to uncontrolled ignitions or to knock. The proportion of unburnt hydrocarbons is increased by quenching in the gap, leading to increased hydrocarbon emissions in the exhaust gas of gas engines with homogeneous mixture compression. It is therefore desirable to minimize the clearance volume where possible.

For this purpose, European Patent Application EP 1 918 559 A2 discloses an insert, which is designed either as part of a cylinder head gasket or separately from a cylinder head gasket. In order to ensure that force flows only in a radially outer region of the cylinder liner, the region of the insert filling or sealing off the clearance volume is of weakened design and/or formed from a softer material in comparison with a region in which contact forces are introduced. Particularly owing to manufacturing tolerances in series production, however, it is not possible in this way in all cases actually to seal off the clearance volume without a gap and at the same time to ensure that contact pressure forces are introduced only in the radially outer region provided for this purpose. Even the material which is softer or weakened in comparison with the material provided in the region for the introduction of force still has a hardness which makes it necessary to provide at least a slight gap for tolerance matching if all effects on the path of the forces is to be avoided. Although the clearance volume is reduced in this way, it is not closed in an effective manner.

SUMMARY OF THE INVENTION

It is the underlying object of the invention to provide an insert and an internal combustion engine by means of which or in which the clearance volume can be sealed efficiently while at the same time ensuring in all cases that the flow of force for fastening the cylinder liner is transmitted exclusively in the radially outer region provided for this purpose.

The object is achieved by providing an insert that comprises at least one compressible material. It is thereby possible to compress the insert without a significant expenditure of force to an actually existing axial gap dimension, i.e. an axial clearance between the first and the second end face, while the clearance volume is sealed efficiently and, at the same time, any influence on the flow of force in the radially outer region of the liner collar is avoided.

There is a preference for an insert which is characterized in that the at least one compressible material is chosen so that a force required in series production to deform the insert to a minimum axial gap dimension, to be expected, of the clearance volume is small in comparison with a static force acting on a force introduction element in the fastening section of the cylinder liner. It is not absolutely essential that a separate force introduction element should be provided. The collar of the cylinder liner itself can also be provided as a force introduction element, or a cylinder head gasket can act as a force introduction element. The insert is preferably capable of being compressed to half its axial height, for which purpose only a force which is negligible in comparison with the force acting in the fastening section is required. Accordingly, the flow of force for fastening the cylinder liner is not altered or is at least not altered significantly by the insert. This can adapt flexibly to an axial gap dimension which is actually present in respect of the manufacturing tolerances without significantly altering the flow of force while, at the same time, the clearance volume is efficiently sealed or closed or filled with respect to the combustion chamber.

There is a preference for an insert which is characterized in that the force required to deform said insert to a minimum axial gap dimension, to be expected, of the clearance volume is from at least 4 to at most 8 kN. The force is preferably from at least 5 to at most 7 kN, preferably 6 kN, particularly preferably 6.4 kN. As an alternative, especially if the insert comprises some other material, the force is preferably from at least 0.5 to at most 2 kN, preferably from at least 1 to at most 1.5 kN, particularly preferably 1.4 kN. With the values discussed here for the compression forces acting on the insert, it is at least ensured that these are significantly lower and are negligible in comparison with the static forces which act in the fastening section of the cylinder liner. Accordingly, a flow of force present there is not altered or is at least not altered significantly, that is to say at most in a negligible way, by arranging the insert in the clearance volume.

There is a preference for an insert which is characterized in that the at least one compressible material comprises a material chosen from a group comprising a ceramic fiber felt, a woven ceramic fiber material, a ceramic fiber mat, a nonwoven ceramic fiber material, a metal, especially a metal alloy, and a graphite film. It is possible to combine said materials with one another or with other suitable materials. However, the insert preferably consists of one of said materials. As a particularly preferred option, the material chosen for the insert is one whose structure makes it compressible. This is the case especially when a fiber material is selected, said material preferably being designed as a woven fabric, a non-crimp fabric, a weft knitted fabric, a warp knitted fabric, a felt, a nonwoven or a mat. By virtue of the interspaces between the fibers, the material is compressible. An insert which comprises a metal and/or a metal alloy is preferably designed to be compressible by virtue of its shape. In particular, the cross-sectional shape selected for the insert is then preferably such that the insert is compressible—as seen in the axial direction. If the insert comprises a graphite film, this is preferably designed to be compressible by virtue of its material structure. It is possible to combine compressibility based on a geometry of the insert with compressibility due to the material structure, especially if the insert comprises more than one material.

There is a preference for an insert which is characterized in that it consists of at least one compressible material. In that case, provision is preferably made for the insert to be formed as it were homogeneously from a single compressible material, with one of the abovementioned materials preferably being selected for the insert.

It is also possible for the insert to comprise a substrate material, wherein the at least one compressible material is provided on one side or both sides on at least one axial end surface of the substrate material. A metal sheet is preferably provided as the substrate material. It is also possible for the at least one compressible material to be arranged as it were sandwich-fashion between two oppositely arranged substrate elements—as seen in the axial direction. In this case, the substrate elements are preferably of annular design and are preferably arranged concentrically with one another.

In one illustrative embodiment, in which the insert comprises a substrate material and the at least one compressible material, it is possible for the substrate material to be of compressible configuration by virtue of its geometrical shape, while the at least one compressible material is compressible by virtue of its material structure. In this way there is as it were a two-fold compressibility with spring elements arranged as it were in series—as seen in the direction of force.

It is also possible for the substrate material to be of incompressible design, wherein the compressibility of the insert is based exclusively on the at least one compressible material. Finally, it is also possible for both the substrate material and the at least one compressible material to be of compressible configuration by virtue of a corresponding geometrical shape. An illustrative embodiment in which the substrate material is of incompressible design has the advantage that the insert overall is relatively stiff and is therefore easier to handle than if both the substrate material and the at least one compressible material are of compressible design.

In the context of an illustrative embodiment of the insert which is compressible only by virtue of its geometrical shape, the term "compressible" does not refer to the material of the insert as such being compressible in the sense of a property of the material. On the contrary, it merely refers to the fact that the insert as such can be compressed or deformed—as seen in the axial direction—by virtue of the geometrical shape of the material thereof.

There is a preference for an insert which is characterized in that the at least one compressible material is a honeycomb structure. This is preferably the case when the insert comprises a graphite film. The honeycomb structure brings about compressibility of the material, wherein the cells are preferably arranged in such a way that forces which cause compression of the insert are introduced substantially perpendicularly to walls of the individual cells but at any rate not parallel to the walls. In this way, it is possible for the cell walls to be swiveled or to give way owing to the compression forces, as a result of which the material is compressed or crushed overall. It is obvious that the material of the insert would be very much stiffer or less compressible if the cells were oriented in such a way that the forces were introduced parallel to the walls of the cells. It is not necessarily envisaged that the individual cells will have a hexagonal shape but this is possible in a preferred illustrative embodiment. If the cells have a hexagonal structure, they are preferably arranged in such a way—according to what has been stated above—that a sixfold axis of symmetry of the cells is oriented perpendicularly to the direction of introduction of force. In this case—as already described—particularly good compressibility is obtained. Cells which have a different shape or symmetry are preferably oriented in a corresponding way.

There is also a preference for an insert which is characterized in that it comprises a half-bead. This is preferred especially when the insert comprises a metal alloy or is composed of a metal alloy. It is then preferably designed as a bead ring, in particular as an annular insert having a half-bead, wherein the compressibility or crushability or deformability of the insert is ensured by the half-bead shape.

There is also a preference for an insert which is characterized in that it is matched geometrically to the cylinder liner in such a way that—as seen in the radial direction—it extends as far as a combustion chamber boundary in the installed state. In this case, the insert fills the clearance volume—in the radial direction—at least as far as the combustion chamber boundary and seals it with respect to the combustion chamber. Owing to the compression of the insert, it fills the clearance volume—as seen in the axial direction. The possibility that residual gas will enter the clearance volume or that an undefined state of mixing will arise therein is therefore excluded.

There is also a preference for an illustrative embodiment in which the insert is designed in such a way and matched to the cylinder liner and the cylinder head in such a way that it completely fills the clearance volume in the installed state, preferably ending at the combustion chamber boundary and consequently not projecting beyond the latter into the combustion chamber.

There is also a preference for an insert which is characterized in that it is of substantially annular design. Thus, it has an outside and an inside diameter, wherein these are matched geometrically to the clearance volume. In particular, provision is preferably made for the inside diameter of the insert to be matched to an inside diameter of the cylinder liner in such a way that the insert does not project into the combustion chamber of the cylinder—as seen in the radial direction. The inside diameter of the insert is preferably chosen to be equal to the inside diameter of the cylinder liner, ensuring that the insert extends as far as the combustion chamber boundary and seals and fills the clearance volume. It is possible for the cylinder liner to have a chamfer, in the region of which the inside diameter thereof—as seen in the axial direction—increases toward the insert. In this case, the inside diameter of the insert is preferably chosen to be equal to the cylinder liner inside diameter directly adjoining the insert.

The object is also achieved by providing an internal combustion engine characterized in that an insert according to one of the illustrative embodiments described above is arranged at least in some area or areas in an interspace, also referred to as a clearance volume, between the first and the second end face. This results in advantages which have already been described in connection with the insert.

As seen in the radial direction, the insert preferably extends as far as a combustion chamber boundary of the internal combustion engine. As a result, it seals the clearance volume with respect to the combustion chamber. As a particularly preferred option, the insert fills the clearance volume completely, wherein it preferably ends at the combustion chamber boundary, i.e. does not project beyond the latter—as seen in the radial direction—into the combustion chamber.

Finally, there is a preference for an internal combustion engine which is characterized in that the insert is designed as a separate component. It is then provided, in particular, as an annular element, independently of a coke scraper ring, of the cylinder liner, of the cylinder head, of a cylinder head gasket and/or of the force introduction element. As an alternative preference, the insert is designed as part of a coke scraper ring, of the cylinder liner, of the cylinder head, of a cylinder head gasket and/or of the force introduction element. In particular, the insert, more particularly the at least one compressible material of the insert, is molded, adhesively bonded, welded, sintered, cast or forged onto the further component, or is secured in some other suitable way thereon. A subassembly consisting of the further element and the insert is therefore preferably provided.

A particularly advantageous configuration is obtained if the insert is provided as part of the liner itself. This is possible particularly if an adhesive joint that is stable at high temperatures is provided in a connecting region between the cylinder liner and the insert.

BRIEF DESCRIPTION OF THE DRAWING

The invention is explained in greater detail below with reference to the drawing, in which.

DETAILED DESCRIPTION OF THE INVENTION

Figure 1:
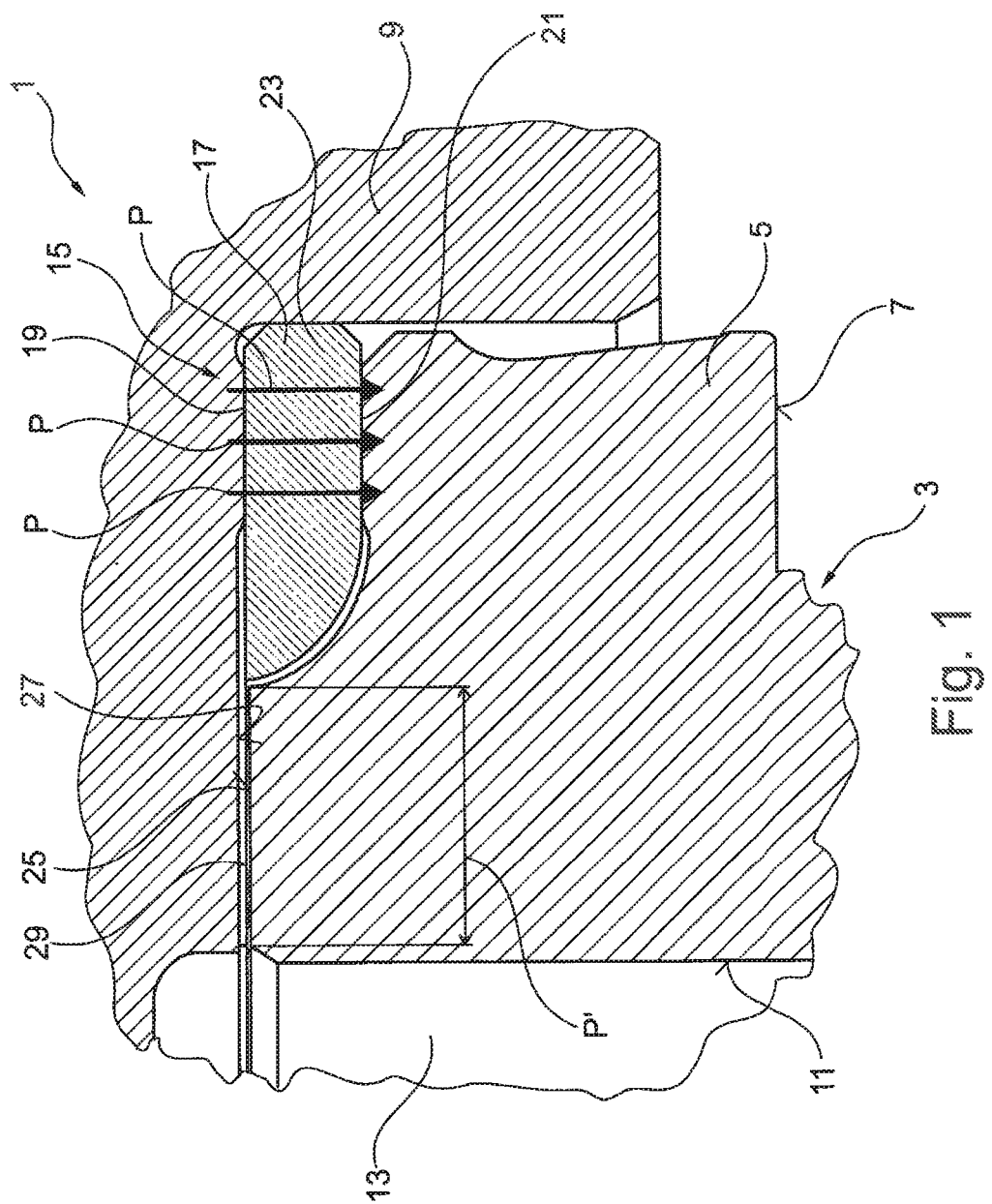
FIG. 1 shows a detail view of a cylinder of an internal combustion engine in longitudinal section.

FIG. 1 shows a detail view of a cylinder 1 of an internal combustion engine in longitudinal section. The cylinder 1 comprises a cylinder liner 3, which is supported—as seen in the axial direction—by means of a liner collar 5 in the region of a supporting surface 7 on a "balcony seat" of a cylinder block (not shown here).

In general terms, an "axial direction" refers here to a direction parallel to an axis of symmetry of the cylinder 1 or of the cylinder liner 3, that is say at the same time to a direction in which a piston arranged movably in the cylinder liner 3 moves during operation of the internal combustion engine. A "circumferential direction" refers to a direction which is oriented along a circumferential line around the axial direction. A "radial direction" refers to a direction which is perpendicular to the axial direction.

On a side which—as seen in the axial direction—lies opposite a piston arranged movably in the cylinder liner 3, the cylinder 1 is closed by a cylinder head 9. The cylinder head 9, an inner wall 11 of the cylinder liner 3 and the piston delimit a combustion chamber 13, in which combustion which ultimately drives the internal combustion engine takes place.

The cylinder liner 3 is secured in the internal combustion engine by being pressed axially by means of the contact surface 7 against the balcony seat of the crankcase. For this purpose, static retention forces are introduced into a force introduction element 17 by the cylinder head 9 in a fastening section 15. These static retention forces are indicated in FIG. 1 by 3 arrows denoted by P.

To ensure that—as seen in the radial direction—an inner region of the cylinder lining 3 which is not supported on the balcony seat is not sheared off by the retention forces, the fastening section 15 is deliberately arranged in a region of the liner collar 5 which is on the outside—as seen in the radial direction. In the illustrative embodiment shown, the cylinder head 9 has, for this purpose, a projection 19, preferably of annular design, which rests on the force introduction element 17. Conversely, the liner collar 5 has a projection 21—preferably likewise of annular design—which, as a particular preference, is arranged opposite the projection 19 of the cylinder head 9—as seen in the axial direction—ensuring that the static retention forces are introduced in a defined manner from projection 19, via the force introduction element 17, into projection 21.

It is not absolutely essential here that the force introduction element 17 should be provided as a separate element. It is equally possible for the force introduction element 17 to be designed as a region of the liner collar 5, in which case projection 19 and projection 21 then preferably rest directly upon one another.

In the illustrative embodiment shown, however, a separate force introduction element 17 is provided, which is here designed as a copper-plated iron ring 23. This simultaneously acts as a cylinder head gasket. In another illustrative embodiment, it is possible for a separate cylinder head gasket to be provided as an alternative or as an addition to the force introduction element 17, or for the cylinder head gasket to act as a force introduction element 17.

An interspace, also referred to as a clearance volume 29, is formed radially to the inside of the projections 19, 21, between a first end face 25 of the cylinder liner and a second end face 27 of the cylinder head 9. This ensures that the static retention forces act exclusively in the fastening section 15. Owing to manufacturing tolerances, a height of the clearance volume 29—measured in the axial direction—varies between 0.2 mm and 0.4 mm in series production. Overall, the clearance volume 29 has a negative effect on combustion in the cylinder 1 since a mixture of undefined composition forms there, or since hydrocarbons that have not burned and the intermediates thereof can settle there. As a result, potential knock zones can form in the clearance volume 29.

An insert (not shown here) is therefore preferably arranged in the clearance volume 29 in order to seal or eliminate it, wherein the insert is particularly preferably provided in a region indicated here by the double arrow P'.

In this case, the insert is preferably of annular design and corresponds in its geometry to the clearance volume 29 or the region indicated by the double arrow P'. In particular, provision is preferably made to ensure that the insert does not project into the combustion chamber 13—as seen in the radial direction. However, it does preferably extend—as seen in the radial direction—as far as a combustion chamber boundary defined by the inner wall 11.

The insert comprises a compressible material and is designed in such a way that it seals the clearance volume 29 reliably, irrespective of manufacturing tolerances present in a specific illustrative embodiment of the internal combustion engine or of the cylinder 1. Accordingly, it preferably has a height—as measured in the axial direction—which corresponds at least to a maximum axial spacing to be expected between the first end face 25 and the second end face 27. In the illustrative embodiment under consideration, this height is accordingly preferably 0.4 mm.

At the same time, the material is preferably chosen so that—once again as seen in the axial direction—it can be compressed down to a minimum spacing to be expected between the first end face 25 and the second end face 27, i.e. to a minimum gap dimension to be expected of the clearance volume 29 without the occurrence during this process of forces which would be non-negligible in comparison with the static retention forces acting in the fastening section 15. In the illustrative embodiment shown, this lower dimension is about 0.2 mm. Accordingly, the compressible material is preferably chosen here so that it can be compressed approximately by half its height in the unloaded state, wherein the force required for this purpose is small or negligible in comparison with the static forces acting in the fastening section 15.

Overall, it is ensured in this way that the clearance volume 29 is sealed in a leaktight manner, irrespective of the manufacturing tolerances that are actually present, while, at the same time, the exclusive flow of force via the fastening section 15 is not disrupted because the compression forces acting in the region of the insert are at most small, in particular negligible, in comparison with the static retention forces in the fastening region 15. In the region of the clearance volume 29, there is therefore no gap remaining in order to ensure the corresponding flow of force. Conversely, there is no risk at all, despite efficient sealing of the clearance volume 29, that a region of the cylinder liner 3 which is not supported on the balcony seat will be sheared off.

Figure 2:
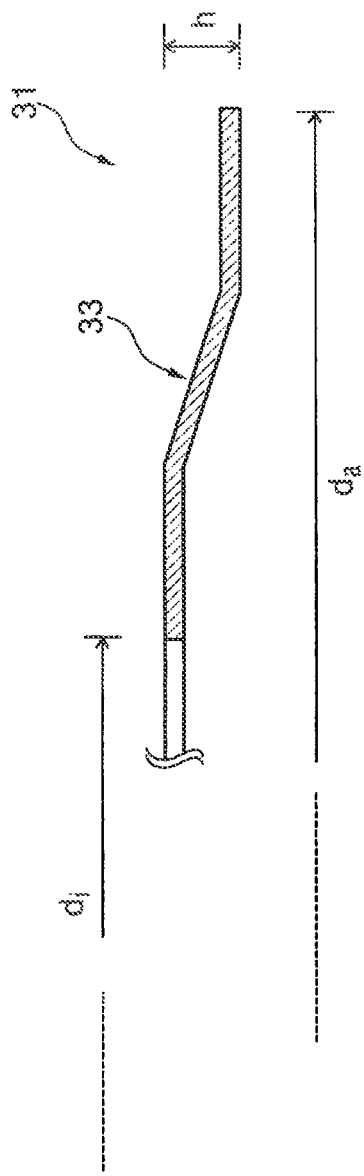
FIG. 2 shows a detail view of an insert in longitudinal section.

FIG. 2 shows a detail illustration of an illustrative embodiment of an insert 31 in longitudinal section. The illustrative embodiment of the insert 31 which is shown is formed from a metal alloy and—as seen in longitudinal section—has a region which is offset or a half-bead 33, which gives the insert 31 its compressibility. It is shown here in the unloaded state, wherein a height h—measured in the axial direction—corresponds approximately to a maximum axial gap dimension of the clearance volume 29 that is to be expected, preferably being made slightly larger, thus ensuring that the insert 31 efficiently seals the clearance volume 29, even in the case of the maximum gap dimensioned to be expected. The height h is preferably approximately 0.4 mm. The insert 31 can be compressed to a height h of about 0.2 mm without the occurrence of forces which would be non-negligible in comparison with the static retention forces acting in the fastening section 15.

In the illustrative embodiment of the insert 31 shown, the forces required for the compression thereof are preferably from at least 4 to at most 8 kN, preferably from at least 5 to at most 7 kN, preferably 6 kN, particularly preferably 6.4 kN. In another illustrative embodiment, in which the insert 31 is designed as a graphite film with a honeycomb structure, the corresponding forces are preferably from at least 0.5 to at most 2 kN, preferably from at least 1 to at most 1.5 kN, particularly preferably 1.4 kN.

The insert 31 is preferably of annular design, here having an outside diameter $d_a$ and an inside diameter $d_i$. In the illustrative embodiment of the insert 31 which is shown in FIG. 2, which is designed for use in the illustrative embodiment of the cylinder 1 which is shown in FIG. 1, the outside diameter $d_a$ is preferably 188.5 mm, while the inside diameter $d_i$ is preferably 172 mm.

It is possible for the insert 31 to be designed as an O-ring or as a C-ring. Other shapes for the insert 31 are also possible. Depending on the shape and/or design of the insert 31, it is possible for the first end face 25 to be machined in a manner appropriate for contact with the insert 31.

The following is found: owing to the insert 31 arranged in the clearance volume 29, a combustion pressure prevailing in the combustion chamber 13 cannot propagate effectively into the clearance volume 29. This is an efficient way of preventing a dynamic additional force from acting periodically on the fastening section 15 and especially also on the balcony seat during the combustion stroke of the cylinder 1. At any rate, the additional dynamic force which arises periodically during combustion is significantly minimized by the insert 31. This increases the endurance of the cylinder liner 3 and especially also of the cylinder 1.

Overall, it is found that a clearance volume 29 can be efficiently minimized or preferably even eliminated with the aid of the insert 31, while, at the same time, a flow of force in the fastening section 15 is not altered.

The invention claimed is:

1. An insert for arrangement in a clearance volume between a first, top-most end face of a cylinder liner, the first, top-most end face facing a cylinder head, and a second end face of the cylinder head, the second end face facing the cylinder liner, wherein the insert comprises at least one compressible material;
    wherein the insert has an outside diameter and an inside diameter; and
    wherein the outside diameter and the inside diameter are matched geometrically to the clearance volume so that in an installed state the insert does not extend radially beyond a boundary between the combustion chamber and the clearance volume, wherein the insert further comprises a substrate material, the at least one compressible material being provided on an axially endmost surface of the substrate material.

2. The insert as claimed in claim 1, wherein the at least one compressible material has properties so that, as seen in an axial direction of the cylinder liner, a force required to deform the insert to a minimum axial gap dimension, to be expected, of the clearance volume is small in comparison with a static force acting on a force introduction element in a fastening section of the cylinder liner.

3. The insert as claimed in claim 2, wherein the force is from at least 4 to at most 8 kN.

4. The insert as claimed in claim 3, wherein the force is from at least 5 to at most 7 kN.

5. The insert as claimed in claim 4, wherein the force is 6 kN.

6. The insert as claimed in claim 4, wherein the force is 6.4 kN.

7. The insert as claimed in claim 2, wherein the force is from at least 0.5 to at most 2 kN.

8. The insert as claimed in claim 7, wherein the force is from at least 1 to at most 1.5 kN.

9. The insert as claimed in claim 2, wherein the force is 1.4 kN.

10. The insert as claimed in claim 1, wherein the at least one compressible material comprises at least one of: a ceramic fiber felt; a woven ceramic fiber material; a ceramic fiber mat; a nonwoven ceramic fiber material; a metal; a metal alloy; and a graphite film.

11. The insert as claimed in claim 1, wherein the at least one compressible material consists of one of a ceramic fiber felt; a woven ceramic fiber material; a ceramic fiber mat; a nonwoven ceramic fiber material; a metal; a metal alloy; and a graphite film.

12. The insert as claimed in claim 1, wherein the insert consists of the at least one compressible material.

13. The insert as claimed in claim 1, wherein the substrate material is at least one metal sheet.

14. The insert as claimed in claim 1, wherein the at least one compressible material is arranged between two substrate elements that are annular and are arranged concentrically opposite one another.

15. The insert as claimed in claim 1, wherein the at least one compressible material is a honeycomb structure.

16. The insert as claimed in claim 1, wherein the insert comprises a half-bead.

17. The insert as claimed in claim 1, wherein the insert is substantially annular.

18. An internal combustion engine, comprising:
at least one cylinder having a top end, wherein the at least one cylinder comprises: a cylinder liner having a first, top-most end face; and a cylinder head that has a second end face facing the first, top-most end face of the cylinder liner;
a force introduction element is provided so that a static retention force is introduced by the cylinder head into the cylinder liner in a region of the force introduction element, the force introduction element directly contacting the cylinder head and the cylinder liner;
and an insert according to claim 1 is arranged at least in an area in an interspace between the first, top-most end face and the second end face, the insert being a separate part from the force introduction element.

19. The internal combustion engine as claimed in claim 18, wherein the insert is a separate component.

20. The internal combustion engine as claimed in claim 18, wherein the insert is part of at least one of: a coke scraper ring; the cylinder liner; the cylinder head; a cylinder head gasket; and the force introduction element.

* * * * *